July 4, 1961 C. A. HIMEBAUGH 2,990,647
FLOWER AND VINE-SUPPORTING DEVICE
Filed May 5, 1958
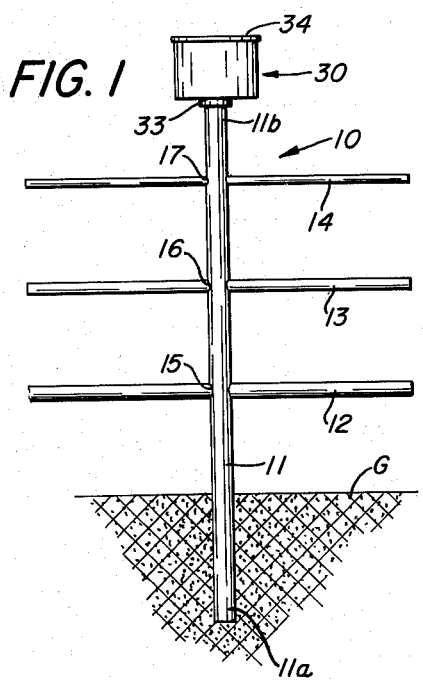
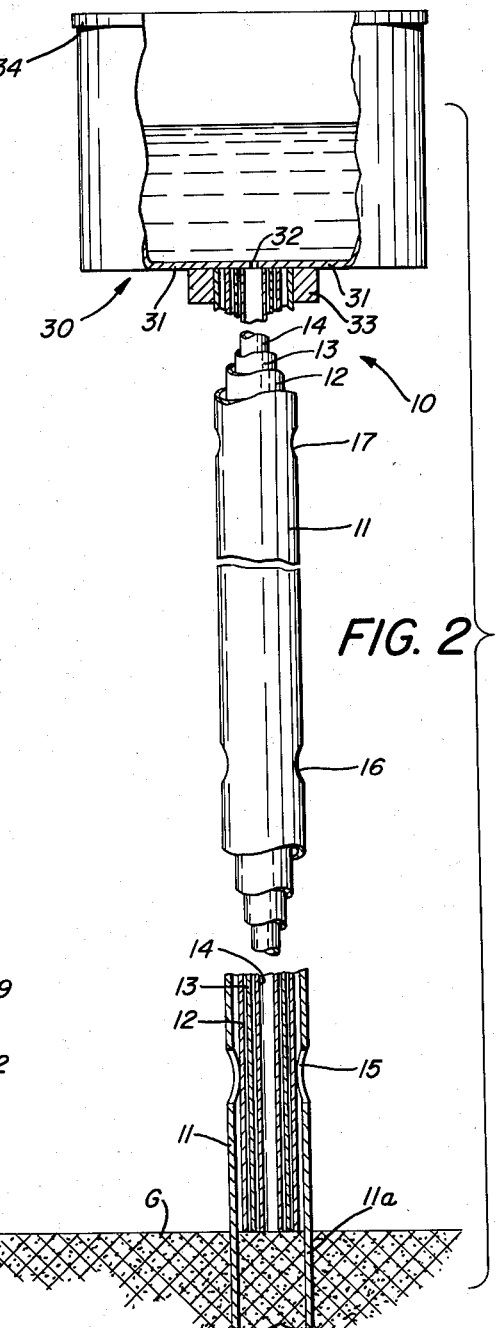
INVENTOR.
CHARLES A. HIMEBAUGH
BY
ATTORNEY United States Patent Office 2,990,647
Patented July 4, 1961

2,990,647
FLOWER AND VINE-SUPPORTING DEVICE
Charles A. Himebaugh, 429 E. Buchtel, Akron, Ohio
Filed May 5, 1958, Ser. No. 733,193
2 Claims. (Cl. 47—47)

This invention relates to a device for supporting flowers and vines during their growth period and in particular has reference to a device of this general character that is characterized by the fact that the same also includes means for properly irrigating the supported plant life during growth.

In the raising of flowers or vines, for example, it has long been known that best results can be obtained if the flowers are supported during growth so that as the growth period continues, the flower or vine can rise to higher and higher distances above the ground. Conventionally in plants of this type, it has been the practice to drive a stake into the ground and preferably place cross-arms on the same so that the vine or flower can be supported on these members during growth.

While devices of this type are generally satisfactory in usage, it has been found in the past that the storage of the same represents a problem because of the bulk and space requirements of the same. Additionally, it has been found that it is difficult to properly water or irrigate the plants during growth since it is only possible to irrigate the exposed surface of the ground at frequent intervals.

It has been found that improved results can be obtained by employing a collapsible type of support device that is characterized by the fact that the transversely extending supporting arms thereof can be removed from the upright standard and telescopically stored within the same.

It has been further found that even further improved results can be obtained by attaching to the projecting end of the upright standard, a container or vessel that serves as a liquid reservoir that will continuously supply water through the upright standard to permit the same to soak the root area of the plant.

In this fashion, a continuous irrigation can be achieved rather than a sporadic watering at spaced intervals.

It accordingly becomes the principal object of this invention to provide an improved type of flower and vine-supporting device that is characterized by the fact that the same can be conveniently collapsed and stored in a minimal amount of space.

It is a still further object of this invention to provide a device of the above type further characterized by the presence of watering means that serve to continuously supply a source of water or other irrigating media to the plant during the period the same is supported on the supporting member.

These and other objects of the invention will become more apparent upon a reading of the following brief specification considered and interpreted in the light of the accompanying drawings.

Of the drawings:
FIGURE 1 is an elevational view of the improved standard with the cross-arms assembled.
FIGURE 2 is an elevational view, partly broken away and in section and showing the position of the component parts in the stored or collapsed condition with the irrigation means being shown in operation.
FIGURE 3 is a fragmentary sectional view showing the connection of the cross-arms with respect to the upright standard.

Referring now to the drawings and in particular to FIGURE 1, it will be seen that the improved supporting device, generally designated by the numeral 10, includes an upright standard 11, having releasably associated therewith a series of cross-arms 12, 13 and 14, with the standard 11 having its lower end 11a embedded in the ground G so as to position the members 12, 13 and 14 at varying heights above ground G as is clearly shown in FIGURE 1 of the drawings.

In this regard, it is to be understood that the preferred embodiment of the invention contemplates a concentric telescoping of the members 12, 13 and 14 within each other as well as within the member 11 as shown in FIGURE 2, and accordingly, the member 11 is preferably of tubular configuration and has an internal wall diameter larger than the external diameter of the members 12, 13 and 14. Similarly, the members 12, 13 and 14 are preferably tubular and are of varying sizes so that member 14 can be telescoped within the member 13, which, in turn, can be telescoped within the member 12 as shown in FIGURE 2 of the drawings.

To the end of insuring snug reception of the members 12, 13 and 14 with respect to the upright standard 11, the same (standard 11) is shown provided with a series of opposed apertures that are designated generally by the numerals 15, 16 and 17; the arrangement being such that the diameter of the aperture 15 approximates the external diameter of member 12 while the diameter of the members 16 and 17 approximate the external diameter of the members 13 and 14 respectively.

Also, and as best shown in FIGURE 3, where a typical connection such as the connection between the member 12 and the member 11 is illustrated, the preferred embodiment of the invention contemplates that the cross member 12 be provided with cross openings 19 and 20 that are axially spaced with regard to each other so as to receive nails or other pin-type members 21, 21 therein, as shown in FIGURE 3. In this manner axial shifting of the member 12 in bore 15 is obviated, it being understood that shifting of cross arms 13 and 14 could be obviated in like manner.

For the purpose of providing irrigation, the uppermost end 11b of the member 11 is shown receiving an irrigation reservoir that is indicated generally by the numeral 30. This irrigation reservoir 30 is illustrated as being cylindrical in shape and includes a bottom wall 31 within which an opening 32 is located. Preferably, this opening 32 is concentrically located on bottom wall 31 so that fluid passing through the same will pass interiorly of pipe 14 into the ground G as shown in FIGURE 2. In addition to the aforementioned parts, bottom wall 31 also defines a circular flange 33 that has its internal diameter of proper size to be received around the external surface of member 11 as shown in FIGURE 2, with this fit preferably being a sliding type of fit so as to prevent accidental dislodging of the irrigating device. Also, and as best illustrated in FIGURE 2, the upper end of the reservoir 30 is provided with a beaded edge 34, with this area of the reservoir preferably being open to permit filling of the reservoir in an easy fashion.

In use or operation of the improved flower-supporting device, it will first be assumed that it is desired to assemble the same, and, accordingly, the member 11 will first have the end 11a thereof pushed into the ground G to assume the condition shown in FIGURE 1. At this time, the members 12, 13 and 14 can be respectively positioned within apertures 15, 16 and 17 and upon positioning of the same, nails or pins 21, 21 can be provided through the openings 19 and 20 of each member to avoid axial shifting of the same with respect to standard 11. At this time, it is merely necessary that the flange 33 of reservoir 30 be fitted over the upper portion 11b of the member 11, and at this time the device is ready for use. Water can be placed in the reservoir 30 from which it will gradually drip or flow into the ground G through the void that exists interiorly of the tubular member 11, and in this manner, the ground will be completely irrigated around the standard 11. If desired, openings (not shown) could be provided in the wall of lower portion 11a for increasing the amount of such irrigation.

When the growing season has been completed and it is desired to store the device, it is merely necessary that the reservoir 30 be lifted off, and upon removal of nails or pins 21, 21 the members 12, 13 and 14 can be removed from their position of support on member 11 and telescoped within each other, with the entire sub-assembly of telescoped members then being stored interiorally of the member 11 as shown in FIGURE 2. If it is still desired at this time to irrigate the ground, it is merely necessary that the reservoir 30 be replaced, at which time the fluid passing through the opening 32 will be directed through the void in member 14 so as to permit irrigation of the ground. If it is desired, however, to store the device for the winter, it is merely necessary that the member 11 be removed from the ground, at which time the compact unit can be stored until ready for reuse.

While a full and complete disclosure of the invention has been set forth in accordance with the dictates of the Patent Statutes, it is to be understood that the invention is not intended to be so limited.

Thus, where a round type of metal pipe has been shown, it is to be understood that the invention contemplates other types and forms of materials including plastic pipe, such as Koroseal, formed in either round, square, or rectangular configuration. Similarly, while the preferred embodiment contemplates an opening in the fluid reservoir, it is to be understood that control means could be associated with this opening to control flow therethrough.

Accordingly, where appropriate, modifications of the invention may be resorted to without departing from the spirit hereof or the scope of the appended claims.

What is claimed is:

1. A device for supporting plant life during growth, comprising; a main support standard of elongate hollow configuration; a cross arm of elongate hollow configuration of smaller cross-sectional dimension than said standard and being shorter in length than said standard, whereby the same may be telescoped interiorly thereof; a reservoir releasably connected to one end of said standard; said reservoir having an outlet opening that is aligned with the longitudinal axis of said standard when said reservoir is connected to said standard; said standard having opposed transverse openings provided in the walls thereof, with the cross-sectional area of said openings approximating the cross-sectional area of said cross arm, whereby the same may be selectively moved between a position of longitudinal alignment with said standard and a position of transverse alignment therewith; the area of said opening in said reservoir being less than the cross-sectional area of said cross arm, whereby fluid passing therethrough will pass interiorly of said cross arm when the same is telescoped within said standard.

2. A device for supporting plant life during growth, comprising; a main support standard of elongate hollow configuration; a plurality of hollow cross arms, each being of shorter length than said standard and each being of progressively decreasing cross-sectional dimension, whereby said cross arms may be telescoped within each other, with the largest cross arm being telescoped within said standard, whereby all said telescoped cross arms may be received interiorly of said standard between the ends thereof; said wall of said standard being provided with a series of axially spaced opposed openings that respectively correspond in cross-sectional area to the respective cross sectional area of said cross arms, whereby said cross arms may be respectively disposed in the respective openings for the same.

References Cited in the file of this patent

UNITED STATES PATENTS

| | | |
|---|---|---|
| 122,952 | McDonald et al. | Jan. 23, 1872 |
| 918,579 | Murch | Apr. 20, 1909 |
| 1,589,400 | Klinglesmith | June 22, 1926 |
| 1,998,031 | Thomas | Apr. 16, 1935 |
| 2,296,217 | Maloney | Sept. 15, 1942 |
| 2,375,860 | Markham | May 15, 1945 |
| 2,383,665 | Malicay | Aug. 28, 1945 |